(No Model.)
H. L. WATTS.
Hoof Parer.
No. 241,170. Patented May 10, 1881.
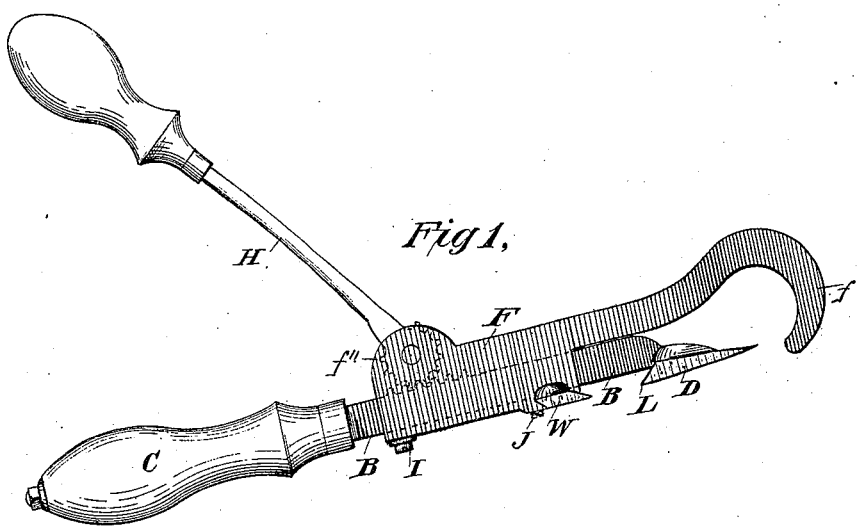
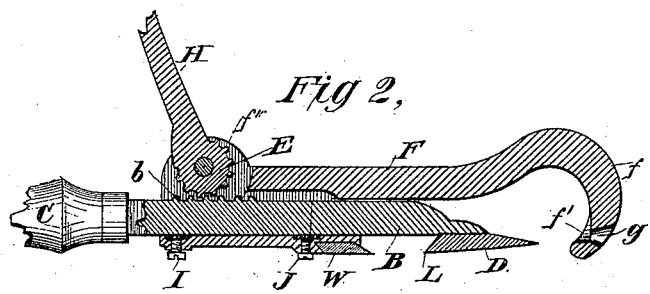
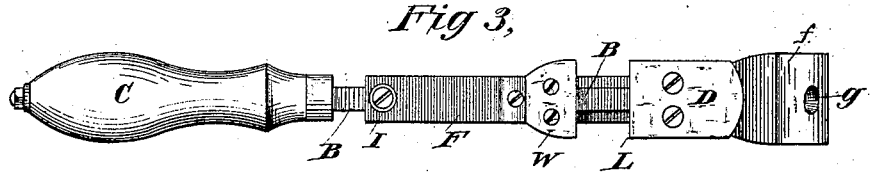
Attest:
John D. Barr.
Thos. M. Coombs.
Inventor:
Henry L. Watts,
By Geo. T. Smallwood
Atty
N. PETERS, Photo-Lithographer, Washington, D. C.

UNITED STATES PATENT OFFICE.

HENRY L. WATTS, OF ST. PETER, MINNESOTA.

HOOF-PARER.

SPECIFICATION forming part of Letters Patent No. 241,170, dated May 10, 1881.

Application filed August 23, 1880. (No model.)

*To all whom it may concern:*

Be it known that I, HENRY L. WATTS, of St. Peter, in the county of Nicollet and State of Minnesota, have invented an Improvement in Hoof-Parers, of which the following is a specification.

The object of this invention is to provide a farrier's tool for preparing the hoof of a horse for the reception of the shoe.

To this end I a provide a combination-tool for performing two operations connected with horseshoeing, one of which is the cutting away and removal of the superfluous growth of the hoof to leave it in proper condition for the reception of the shoe, the other the cutting off of the projecting ends of the nails securing the shoe to the hoof.

The first part of my invention consists in forming a die or anvil provided on its under side with a knife and having a crooked forward end to receive the rim of the hoof, said die or anvil being made hollow for the purpose of receiving a sliding bar provided at its forward end with a knife and at its rear end with a handle. This knife is provided with a cutting-edge upon both back and front. The forward edge is opposed by the crook of the anvil, and the rear edge acts in conjunction with the knife upon the under side of the anvil. This sliding bar is further provided upon its back with a rack, which gears with a segment-pinion pivoted in the top of the anvil, said pinion being formed upon the end of a lever or handle.

The second part of my invention consists in providing the crook at the forward end of the anvil with a cavity and opening, to allow the knife, which is opposed by said crook, to clear itself of chips of hoof, dirt, &c.

The third part of my invention consists in providing set-screws in the under face of the anvil, for the purpose of taking up wear and guiding the knife upon the end of the sliding bar.

In order that my invention may be fully understood, I will proceed to describe it with reference to the accompanying drawings, in which—

Figure 1 is a side view of a complete tool, made in accordance with my invention. Fig. 2 is a vertical longitudinal section of the same, with handles omitted. Fig. 3 is an under-side view.

F is the die or anvil, the forward end, $f$, of which is bent or crooked, as shown, to receive the rim of hoof, and is provided with a cavity, $f'$, for the reception of the knife D, and an opening, $g$, is left in rear of the cavity $f'$ to enable the knife to clear itself of chips of the hoof or other trash, which might fill up the recess $f'$. The knife D is secured to the forward end of a bar, B, which slides back and forth in the hollow die or anvil, as hereinafter described.

Upon the back of the bar B is a rack, $b$, which receives a segment-pinion, E, formed on the extremity of a rod, H, and pivoted between two ears, $f''$ $f'''$, one each side of the hollow die or anvil F.

Upon the lower face of the anvil F is a knife, W, which operates in conjunction with the knife D, as follows: The knife D is provided with a cutting-edge upon both back and front, the forward edge being for the purpose of trimming the hoof of the animal and the rear cutting-edge, L, together with knife W, serves the purpose of cutting off the projecting nails as close as desired to the surface of the hoof.

The under face of anvil F is provided with two set-screws, I J, for the double purpose of taking up the wear of the bar B and serving as a guide to knife D; but these set-screws are not necessary for the perfect working of the device, and when used have a plate of metal placed between them and the bar B, to prevent their wearing grooves in the under face of said bar.

The operation of the device is as follows: The hoof being held in the usual position for being trimmed—that is, reversed between the smith's legs—the crook $f$ is passed over the rim of the hoof to the required distance, which is easily gaged by the eye, and the handles are brought together to project the knife D through the hoof, this operation being repeated to extend the cut entirely around the hoof, to remove in one piece the overgrowth and leave a perfectly level surface for the shoe.

The great power obtained by the geared pinion and lever-handle enables the cutting to be done with ease to the smith, and, from the direction of the cut, with comfort to the horse, as it avoids the strain upon the joint consequent to the use of the ordinary trimming-knife.

All of the knives are made removable to enable them to be sharpened or replaced when desired.

Having thus described my invention, the following is what I claim as new and desire to secure by Letters Patent:

1. The combination, with the hollow die or anvil having the crooked forward end and being provided on its under side with knife W, of bar B, provided with knife D and rack $b$, and lever-handle H, provided with segment-pinion E, as and for the purpose set forth.

2. The combination, with the hollow die or anvil F, provided with knife W, the forward end of said die or anvil being crooked and provided with cavity $f'$, and opening $g$, of bar B, knife D, rack $b$, lever H, and segment-pinion E, as set forth.

3. The combination, with die F, bar B, knife D, rack $b$, lever H, and segment-pinion E, of set-screws I J, for the purpose of taking up wear and guiding knife D, as explained.

HENRY L. WATTS.

Witnesses:
E. S. PETTIJOHN,
JOHN F. SEYMOUR.